United States Patent [19]

Marui et al.

[11] Patent Number: 4,762,148

[45] Date of Patent: Aug. 9, 1988

[54] APPARATUS AND METHOD FOR THE GENERATION AND UTILIZATION OF A SPIRAL GAS STREAM IN A PIPELINE

[75] Inventors: Tomohiro Marui, Tokyo; Masaaki Takarada, Chiba; Yoshiaki Shimura, Yokohama; Minoru Mita, Chiba; Kiyoshi Horii, Tokyo, all of Japan

[73] Assignees: Kawasaki Steel Corporation; Kiyoshi Horii, both of Japan

[21] Appl. No.: 45,187

[22] Filed: May 1, 1987

Related U.S. Application Data

[63] Continuation of Ser. No. 646,216, Aug. 31, 1984, abandoned.

[30] Foreign Application Priority Data

| Sep. 3, 1983 | [JP] | Japan | 58-161214 |
| Sep. 8, 1983 | [JP] | Japan | 58-164191 |
| Sep. 8, 1983 | [JP] | Japan | 58-164192 |
| Oct. 28, 1983 | [JP] | Japan | 58-200731 |
| Jan. 5, 1984 | [JP] | Japan | 59-34 |
| Jan. 5, 1984 | [JP] | Japan | 59-35 |
| Mar. 21, 1984 | [JP] | Japan | 59-52240 |
| Apr. 23, 1984 | [JP] | Japan | 59-80251 |
| May 14, 1984 | [JP] | Japan | 59-94505 |

[51] Int. Cl.$^4$ .......... F15C 1/16; F16L 55/10; B56G 53/42; B02C 12/00
[52] U.S. Cl. .......... 137/808; 138/42; 34/34; 34/57 E; 432/239; 423/659; 423/DIG. 9; 241/5; 241/26; 406/92; 406/194; 210/435
[58] Field of Search .......... 423/659, 455, 456, 522; 137/888, 891, 808; 406/92, 93, 194, 61, 153; 210/758, 435; 138/42

[56] References Cited

U.S. PATENT DOCUMENTS

| 2,890,929 | 6/1959 | Rummert | 423/659 |
| 3,016,916 | 1/1962 | Kraft | 137/891 |

FOREIGN PATENT DOCUMENTS

| 544123 | 1/1966 | Belgium | 423/659 |
| 132802 | 2/1985 | European Pat. Off. | 406/92 |
| 2600162 | 7/1977 | Fed. Rep. of Germany | 423/659 |
| 2728212 | 1/1978 | Fed. Rep. of Germany | 423/659 |
| 2757898 | 6/1979 | Fed. Rep. of Germany | 406/194 |
| 2315464 | 1/1977 | France | 406/194 |
| 46-1564 | 1/1971 | Japan | 423/DIG. 2 |
| 54-28773 | 3/1979 | Japan | 423/246 |
| 58-207219 | 12/1983 | Japan | 406/93 |
| 515188 | 12/1971 | Switzerland | 138/891 |
| 518526 | 7/1976 | U.S.S.R. | 423/522 |

(List continued on next page.)

*Primary Examiner*—Gary P. Straub
*Attorney, Agent, or Firm*—Cushman, Darby & Cushman

[57] ABSTRACT

A spiral gas stream is generated in a pipeline when a uniform flow of gas flowing in a cylinder having inner diameter larger than that of the pipeline is introduced through a funnelform reducer into the inlet of the pipeline and bringing the mean gas stream velocity in the pipeline faster than 20 meter per second. The uniform flow of gas is formed in the cylinder easily when outside low pressure gas is fed into the cylinder through a feed gas inlet pipe installed diagonally at the side of the cylinder apart from the bottom plate so as to make the flow line of the feed gas to cross the axis of the cylinder and inclined toward the bottom plate. When solid particles are introduced into the spiral gas stream zone, they are transported to the outlet of the pipeline. As the compressed gas layer is formed along the inside wall of the pipeline by the spiral motion of gas stream, solid particles don't contact directly with the inside wall of the pipeline and don't hurt it. As the center part of the cross section of the pipeline becomes very low pressure, especially along the axis of the pipeline, solid particles containing or accompanying volatile matters are desiccated or concentrated as a result of the evaporation of volatile matters while being transported in the pipeline. Solid particles deposited on the bottom of water can be dredged and dehydrated by the spiral gas stream transportation system. When solid particles transported by spiral gas stream in two or more pipelines are arranged to collide with mutually, pulverized fine solid particles are recovered. A chemical reaction which can not or hardly to proceed at normal temperature and pressure is promoted in a spiral gas stream zone.

2 Claims, 9 Drawing Sheets

U.S. PATENT DOCUMENTS

| | | | |
|---|---|---|---|
| 3,529,356 | 9/1970 | Dettrich | 423/DIG. 16 |
| 3,541,003 | 11/1970 | Carr et al. | 423/659 |
| 3,960,175 | 6/1976 | Liepe et al. | 137/891 |
| 4,072,468 | 2/1978 | Cheng | 423/456 |
| 4,097,092 | 6/1978 | Lapple | 406/194 |
| 4,127,406 | 11/1978 | Kreft et al. | 423/659 |
| 4,134,966 | 1/1979 | Austin | 423/456 |
| 4,146,359 | 3/1979 | Lumpkin et al. | 423/659 |
| 4,162,970 | 7/1979 | Zlokarnik | 210/758 |
| 4,226,719 | 10/1980 | Woltmann | 210/758 |
| 4,252,780 | 2/1981 | Koppl et al. | 423/659 |
| 4,263,234 | 4/1981 | Prudhon et al. | 423/522 |
| 4,279,881 | 7/1981 | Cheng | 423/456 |
| 4,299,797 | 11/1981 | Cheng | 423/455 |
| 4,446,108 | 5/1984 | Cheng | 423/456 |
| 4,447,401 | 5/1984 | Casperson et al. | 423/456 |
| 4,684,296 | 8/1987 | Horii et al. | 406/153 |

APPARATUS AND METHOD FOR THE GENERATION AND UTILIZATION OF A SPIRAL GAS STREAM IN A PIPELINE

This is a continuation of application Ser. No. 646,216, filed Aug. 31, 1984, which was abandoned upon the filing hereof.

BACKGROUND OF THE INVENTION

1. Field of the Invention

This invention relates to apparatus and a method for the generation of a spiral gas stream in a pipeline, and apparatus and methods for the utilization of the spiral gas stream thus generated for the transportation of solid particles and for other purposes.

2. Description of the Prior Art

It has been widely applied for a long time in industry to transport particles of various solids, including coal, ore and cement, by gas stream in pipeline.

The fundamental principle of this transportation method is very simple: Pressurized gas is fed into a pipeline to form a high-speed gas stream, in which solid particles are suspended and transported to the outlet of the pipeline. To avoid settling of solid particles which may block the pipeline on the midway, it is necessary to keep the velocity of gas stream in the pipeline at high level. In general, solid particles of larger size and higher specific gravity require a higher velocity of gas stream than do smaller and lighter particles.

Consequently, the gas pressure at the inlet of the pipeline should be higher as the size and the specific gravity of the solid particles and the length of the pipeline increase. The gas pressure applied to high pressure pneumatic transportation system ranges usually from 2 to 7 $Kg/cm^2G$.

Several problems have been raised in this conventional pneumatic transportation system. The first problem is considerable wear of the inside wall of the pipeline due to collision of solid particles. When the velocity of gas stream is sufficient to transport solid particles of high specific gravity, the gas stream in pipeline forms a turbulent flow, and the solid particles suspended in that flow violently collide against the inside wall of the pipeline also under a turbulent condition, and if the solid particles are hard, the particles will wear the inside wall of the pipeline as sandblasting might and finally wear out the pipe wall. This phenomenon is remarkable especially in the region of bends in the pipeline.

Since this problem has been not yet effectively solved, it is inevitable to repair or exchange for new parts with a high frequency as high as once a month for the bending parts of a pipeline transporting pneumatically such hard solid particles as ore.

The second problem in the conventional pneumatic transportation system of solid particles by high-speed gas stream in a pipeline arises from the fact that a feeder for supplying solid particles into the pipeline is exposed to high gas pressure.

Usually, a screw conveyor is used as a feeder because a screw conveyor makes it easy to control quantitatively the amount of solid particles to be supplied, but from the structural point of view, a screw conveyor has an inefficient mechanism for sealing against gas pressure within the pipeline. Pressurizied gas at the inlet of the pipeline might blow back in the screw conveyor to form voids in the solid particles there. Not only do such voids lower the conveyor's supply efficiency and make it difficult to control the amount of solid particles to be supplied, but also the fine solid particles blown back into the conveyor enter into the bearings of rotating part in the screw conveyor causing rapid wear of the shafts and bearings. In addition, the hopper for feeding solid particles to the screw conveyor must be also airtight. Consequently, when such a hopper becomes empty, it is necessary to interrupt the transportation of solid particles for the purpose of recharging it or to change over to another hopper.

SUMMARY OF THE INVENTION

It was discovered that the above mentioned first problem incidental to the conventional pneumatic transportation of solid particles could be solved by the utilization of spiral gas stream in a pipeline. It was discovered too that the second problem could be solved by the improved feeding mechanism of solid particles in a spiral gas stream generator.

It was discovered too that the spiral gas stream had several interesting characteristics which could be utilized in wider industrial applications not only for the transportation of solid particles.

An object of this invention is to provide an apparatus and method for the generation of a stable spiral gas stream in a pipeline. The spiral gas stream generator of this invention is comprised of a cylinder having inner diameter larger than that of the pipeline, a bottom plate which is attached to one end of the cylinder to close that end, a funnelform reducer which is connected to the other end of the cylinder so as to reduce the inner diameter of the cylinder equal to the inner diameter of the pipeline smoothly and feed gas inlet pipe which is installed diagonally at the side of the cylinder apart from the bottom end so as to make the flow line of the feed gas to cross the axis of the cylinder and inclined toward the bottom plate. A spiral gas stream is generated in a pipeline by introducing feed gas through this apparatus into the inlet of a pipeline and bringing the mean gas stream velocity in the pipeline to that faster than 20 meter per second.

Another object of this invention is to provide an apparatus and method for the transportation of solid particles in a pipeline which eliminates the wear and tear problem of the inside wall of the pipeline. When solid particles are introduced in the spiral gas stream zone thus generated, the solid particles are suspended in the spiral gas stream and transported to the outlet of the pipeline without any contact with the inside wall of the pipeline.

Further object of this invention is to provide an apparatus and method for the desiccation or concentration of solid particles containing or accompanying volatile matters by utilizing a spiral gas stream in a pipeline. The center zone around the axis of the spiral gas stream becomes very low pressure, and evaporation of volatile matters takes place when solid particles containing or accompanying volatile matters are introduced in the spiral gas stream zone.

Further object of this invention is to provide an apparatus for the dredging of solid particles on the bottom of water utilizing the spiral gas stream transportation system and separate the water which is accompanied with the solid particles while being transported in the pipeline.

Further object of this invention is to provide a method for the pulverization of solid particles by arranging the collision of solid particles each other which are transported by two or more spiral gas transportation systems.

Further object of this invention is to provide a method for the promotion of chemical reaction by forming a spiral gas stream of reactive gas or gas mixture or by introducing reactive components into the spiral gas stream zone.

BRIEF DESCRIPTION OF THE DRAWINGS

Embodiments of the present invention are illustrated schematically in the accompanying drawings, in which.

DETAILED DESCRIPTION OF THE PREFERRED EMBODIMENTS

Figure 1:
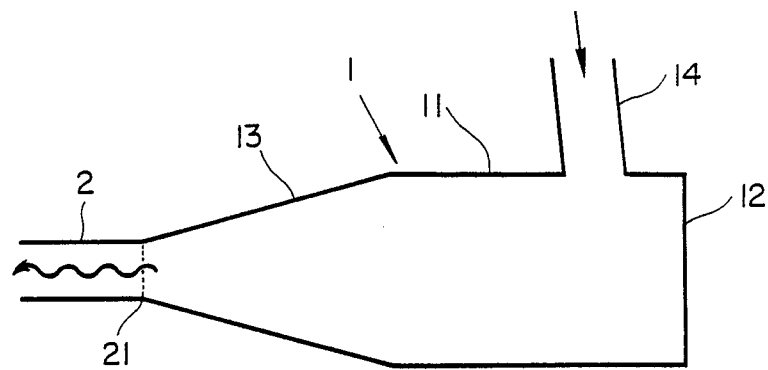
FIG. 1 shows a sectional side view of an apparatus for the generation of a spiral gas stream in a pipeline according to the present invention.

A spiral gas stream widely appears in the nature in various particular forms. Some examples of it are as follows: tornado, sand pillar in a desert, eye of a typhoon, whirlwind etc.

However, the formation and utilization of spiral gas stream has neither been industrially taken into consideration nor developed so far.

It is well known that a tornado, which often occurs in the central part of the North American continent, can suck up into the air even cattle, automobile and house, which will fall then at different spots on the ground and cause a tremendous damage. Though neither so powerful nor of large scale, a similar phenomenon can occur also in Japan: This is the so-called Kai-U (miraculous rain) phenomenon, in which grains, fishes, frogs etc. are sucked up and fall at different spots on the ground. A convincing interpretation of this phenomenon is that it is caused by a wind-spout, that is, the Japanese tornado.

Since such a natural phenomenon as this occurs at an unexpected spot on the ground and an unexpected moment, it can only cause a disaster, but if it is possible to stabilize the existence of a similar phenomenon as a "field" between the specified spots, material can be transported by this means among these spots. This invention provides apparatus and methods for achieving this object.

It is generally adopted that a circular gas stream is artificially generated by feeding gas stream at a high velocity into a cylinder in a direction tangential to its circumference, and this principle is applied to a cyclone etc.

At first the inventors investigated this method, but it has been discovered that even if a spiral gas stream is formed near its feeding part by the method, it gradually disappears in a longer pipeline so that it cannot be maintained stably.

The essence of a tornado is a mass of air stream, which ascends when its specific gravity decreased by warming, and the atmospheric pressure at the central part of the mass becomes lower as the ascending velocity increases. New air flows into this low pressure zone and the mass of air stream begins to rotate by this blowing-in air, then centrifugal force caused by its rotation decreases further the pressure of the central part and more air is drawn into the part to accelerate the rotation.

Though tornado is generated by a rising stream of warmed air, it is impossible to generate a similar spiral gas stream in a pipeline by feeding air compulsively into it at a high velocity. If air is fed under the condition generally applied to industrial pneumatic transportation etc., that is, if compressed air is fed into a pipeline through a valve etc. in a condition with its pressure difference similar to adiabatic expansion, only a turbulent flow appears and any stable spiral gas stream does not.

From the observation of the structure of tornado and sand pillar in a desert, it can be seen that the starting part near the ground surface has a funnel-like form. By reproducing such a condition as this, the present invention provides a spiral gas stream in a pipeline, that is, a gas flow, which proceeds in the pipeline while individual gas molecules are circulating spirally.

If was discovered that a spiral gas stream is generated in a pipeline by introducing a uniform flow of gas flowing in a cylinder having inner diameter larger than that of the pipeline through a funnelform reducer into the inlet of the pipeline and bringing the mean gas stream velocity to that faster than 20 m/sec. in the pipeline.

In more detail, a uniform flow of gas flowing in a cylinder means a parallel flow of gas in a cylinder which only has a vector parallel to the axis of the cylinder and has not a vector to promote the rotation of the gas flow in the cylinder. The pulsation of the gas flow is not preferable too.

When the uniform flow of gas in the cylinder is introduced into the inlet of a pipeline through a funnelform reducer which is connected to one end of the cylinder and making the diameter of the passage of the gas stream to reduce to the diameter equal to that of the pipeline smoothly and bringing the mean gas stream velocity in the pipeline to that faster than 20 m/sec., a spiral gas stream is generated in the pipeline.

To make a uniform flow of gas in a cylinder having only a vector parallel to the axis of the cylinder by diminishing the pulsation of gas flow originated from outside gas source and the turbulence of gas flow which has been caused by the introduction of feed gas into the cylinder, it is necessary either to make the length of the cylinder long enough or to make the inner diameter of the cylinder wide enough to keep the mean gas stream velocity slow in the cylinder, and as a result, the apparatus becomes a massive one.

This invention provides a compact apparatus for the generation of a spiral gas stream in a pipeline by adjusting the inclination angle of the feed gas inlet pipe to the cylinder.

Figure 2:
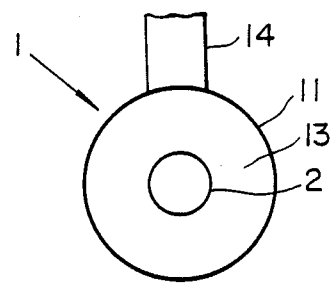
FIG. 2 shows an outside view of the same apparatus from the pipeline side.

FIG. 1 is a sectional side view of basic structure of a spiral gas stream generator of this invention and FIG. 2 shows the outside view of the spiral gas generator from the pipeline side. The spiral gas stream generator (1) is comprised of a cylinder (11) which has inner diameter larger than that of the pipeline (2), a bottom plate (12) which is attached to one end of the cylinder to close that end, a funnelform reducer (13) which is connected to the other end of the cylinder so as to reduce the inner diameter of the cylinder equal to that of the pipeline smoothly and a feed gas inlet pipe (14) which is installed diagonally at the side of the cylinder apart from the bottom end so as to make the flow line of the feed gas into the cylinder to cross the axis of the cylinder and inclined toward the bottom plate.

As mentioned above, this invention provides a compact spiral gas stream generator with relatively shorter length and smaller diameter of the cylinder part. This effect was discovered experimentally, but the reason of such an effect can be explained as follows.

As the feed gas inlet pipe (14) is installed at the side of the cylinder apart from the bottom end, a stagnant gas accumulation is formed in the cylinder near the bottom plate and constitutes a kind of gas reservoir. When feed gas is introduced into the cylinder diagonally through the feed gas inlet pipe (14), the gas flow hit on said stagnant gas accumulation diagonally and bounces off the stagnant gas accumlation to proceed toward the funnelform reducer (13). At that time, the stagnant gas accumulation acts as if it were a cushion and absorbs the pulsation of gas flow originated from the outside gas source and turbulence of gas which has been caused by the introduction of gas flow into the cylinder rapidly.

As a result, the gas flow in the cylinder (11) beyond the installing position of feed gas inlet pipe (14) becomes a uniform flow of gas having only a vector parallel to the axis of the cylinder and flows toward the funnelform reducer (13) in a uniform pressure condition.

From the functional point of view, each part of the apparatus may be called as follows: from the bottom plate to the installing position of the feed gas inlet pipe as the buffer zone; from the installing position of the feed gas inlet pipe to the other end of the cylinder as the streamlining zone; and the funnelform reducer part as the shrinking zone.

Based on the above explanation, the necessary condition for design detail and the range of arbitrariness of the apparatus may be clear.

The buffer zone is effective to make the cylinder shorter and thus to make the apparatus smaller.

The installing position and the inclination angle of the feed gas inlet pipe have mutual relationship in order to install the feed gas inlet pipe at the side of the cylinder so as to make the flow line of the feed gas into the cylinder to cross the axis of the cylinder and inclined toward the bottom plate.

The reason to install the feed gas inlet pipe at the side of the cylinder apart from the bottom end is to make a space for the stagnant gas accumlation near the bottom plate in the cylinder. So the installing position of the feed gas inlet pipe must be set at least 1 cm apart from the bottom plate.

The object to set the flow line of the feed gas inclined toward the bottom plate is to make the feed gas to hit on and bounce off the stagnant gas accumulation. The inclination angle is preferable to be more than 1 degree to the plane parallel to the bottom plate and it is desirable that the flow line of the feed gas does not cross the bottom plate. It means that when the diameter of the cylinder is larger, it must be designed either to set the inclination angle smaller or to set the distance between the installing position of the feed gas inlet pipe from the bottom end larger. If the introduced feed gas directly hit the bottom plate, the stagnant gas accumulation composing the buffer zone is difficult to maintain.

The reason to install the feed gas inlet pipe at the side of the cylinder so as to cause the flow line of the feed gas to cross the axis of the cylinder is to avoid the generation of a vector to promote the rotation of gas stream in the cylinder.

The feed gas introduced from the outside source into the cylinder through the feed gas inlet pipe hits on and bounces off the stagnant gas accumulation near the bottom plate where most of the pulsation and turbulence of the gas flow are absorbed, and flows in the cylinder where the minute pulsation and turbulence are diminished and the gas stream in the cylinder finally becomes a uniform flow of gas which has only a vector parallel to the axis of the cylinder.

In order to make the flow of gas in the cylinder streamlined to a uniform flow rapidly, it is desirable to keep the mean gas stream velocity in the cylinder under 10 m/sec. Therefore the size of the inner diameter of the cylinder is to be decided in consideration of the gas volume to be handled.

The shape of the cross section of the cylinder is not necessarily a perfect circle. It may be a polygon, but in this case the shape of the cross section of the reducer at the cylinder side must be matched to the shape of the cross section of the cylinder and the shape of the cross section of the reducer at the pipeline side must be a circle having an inner diameter same as that of the pipeline.

The funnelform reducer (13) has a shape to reduce the inner diameter of the cylinder equal to the inner diameter of the pipeline smoothly, and the uniform flow of gas which has flown into the funnelform reducer from the cylinder gradually increases its mean gas stream velocity and finally reaches to an gas velocity sufficient to generate a spiral gas stream and introduced into the inlet (21) of the pipeline (2).

Figure 3:
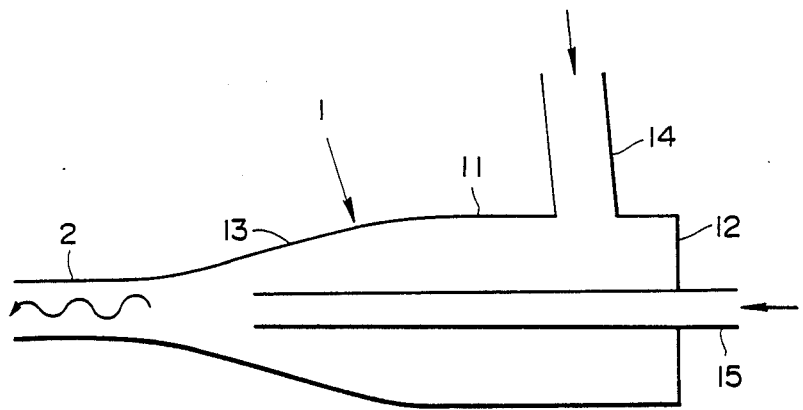
FIG. 3 shows a sectional side view of an apparatus for the transportation of solid particles by a spiral gas stream.

As mentioned above, it is necessary to bring the mean gas stream velocity in the pipeline to faster than 20 m/sec. to generate a spiral gas stream in the pipeline. In some cases, from the standpoint of the utilization of the spiral gas stream, it is required to maintain mean gas stream velocity of 100 m/sec. or more in the pipeline. In such cases, if the funnelform reducer is designed to have a ratio of the cross sectional area at the cylinder side to that at the pipeline side is 20:1, the gas velocity in the cylinder may remain one twentieth of the mean gas stream velocity in the pipeline, for example, 5 m/sec. which is slow enough to avoid the formation of turbulent flow in the cylinder. The shape of the side line of the funnelform reducer may be either a straight line as shown in FIG. 1, or a curve as shown in FIG. 3.

The number of the feed gas inlet pipe is not limited to one. It may be two or more, but in such cases it is preferable to install them at symmetrical or balanced positions. In any case, it must be avoided to install them to promote the rotation of gas stream.

The feed gas to be supplied to this apparatus is needed to have pulsation as little as possible. As high gas pressure is not necessary for the generation of a spiral gas stream, it is preferable to use a gas blower to feed the gas rather than to use a compressor with reciprocating movement.

Air is the most general gas source to be used as the feed gas, but if necessary, nitrogen, hydrogen and other gases could be used as the feed gas, and even a vapor of liquid could be used provided that the whole system is maintained at a temperature higher than the boiling point of the liquid.

When a uniform flow of gas flowing in a cylinder is introduced into the inlet of a pipeline through a funnelform reducer, it is expected that the gas flows in the pipeline keeping the streamlined piston flow state. However, it is observed that a spiral gas stream is generated in the pipeline when the mean gas stream velocity in the pipeline exceeds 20 meter per second. Under this condition, a spiral gas stream, that means a flow of gas in which individual gas molecule proceeds toward the outlet of the pipeline while circulating around the axis of the pipeline, is generated in the pipeline. When the outlet of the pipeline is opened to the atmosphere, the gas pressure at the inlet of the pipeline does not exceed 1 Kg/cm$^2$G.

Of course it is impossible to observe directly a spiral gas stream itself with the naked eye because of its gaseous state, but the existence of a spiral gas stream can be confirmed from the Example 1 and 2 to be described in the following.

A stable spiral gas stream, generated by such a method using such an apparatus as describe above, possesses a material transporting capability in similar fashion to a tornado. If a material is supplied to the spiral gas stream zone in the pipeline, the material is transported to the outlet of the pipeline with spiral movement itself too. As a special case, a material supplied just in the pipeline axis is transported straightforward to the outlet of the pipeline at a very high velocity.

To feed materials into the spiral gas stream zone, a feed pipe (15) is inserted into the cylinder (11) from the center of the bottom plate (12) along the axis of the cylinder and extended toward the reducer part as shown in FIG. 3. Solid particles are fed into the spiral gas stream zone through the feed pipe using a screw conveyor or other same kind of apparatus. In such a case, care must be taken about the gas seal so as not to flow the gas reversely into the feed pipe from the spiral gas stream generation zone as it disturbs the generation of the spiral gas stream itself.

EXAMPLE 1

Figure 4:
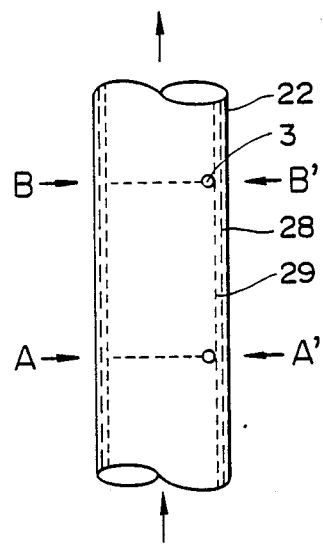
FIG. 4 shows a part of vertical transparent plastic tube used to demonstrate the existence of a spiral gas stream in it in Example 1.
Figure 5:
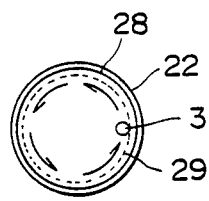
FIG. 5 shows the cross sectional view of the plastic tube at A—A' level shown in FIG. 4.

As shown in FIG. 4, transparent plastic tube (made of polyvinylchloride resin) with inner diameter of 1.5 inch (3.8 cm), having a vertical part (22), was set and an air stream which had been introduced into the inlet of the tube through a spiral gas stream generator (1) as shown in FIG. 3 was flown upward at vertical part. When a plastic resin pellet (3) (cylindrical shape, diameter 5 mm, length 5 mm) was supplied from the feed pipe (15) of the spiral gas generator (1) shown in FIG. 3, the pellet was immediately passed through the vertical part of the tube, if gas velocity was enough fast. However, when the upward vector was well balanced with the downward vector of gravity by adjusting the gas velocity, the pellet was suspended at a certain level of the vertical tube, for example, at A—A' level in FIG. 4 and circulating motion of the pellet on the constant level was observed with the naked eye. That is, as shown in FIG. 5, which is the cross section view of A—A' part of FIG. 4, circulating motion of the pellet as indicated by arrow mark was observed.

When the A—A' part of the tube was narrowed by hand squeezing, the pellet moved up to the somewhat higher part B—B' and continued the circulating motion on that level. It is notable that the pellet (3) was not directly contacted with the inside wall (28) of the tube. It is explained that a compressed gas layer (29) was formed along the inside wall (28) of the tube by centrifugal power of the spiral motion of the gas stream and separated the pellet from the inside wall of the tube. Thickness of the formed compressed gas layer (29) is drawn rather exaggeratedly in the attached FIG. 4 and 5, but in actual it would be less than 1 mm, presumably that of micron order. That is, the pellet was continuing on the circulating motion along the inside of the compressed gas layer (29), keeping well balanced state of the upward vector by the spiral gas stream and the downward vector by gravity. It would be well understood that if gas velocity was increased out of such a balanced state, the pellet would move up to the outlet direction, keeping its circulating motion. When the vertical tube was slowly inclined, the pellet which had been in circulating motion at certain level in the vertical tube begun to move up, keeping the circulating motion (that is, a spiral motion with short pitch) and moved up quickly in the tube and went out of sight when the inclination angle of the tube reached a certain extent.

EXAMPLE 2

200 m length pipeline composed of transparent plastic tube (made of polyvinylchloride resin) with inner diameter of 1.5 inch and its outlet was opened to atmosphere was installed. The pipeline had bends and up and down along its length. An apparatus as shown in FIG. 3 was put at the inlet of the pipeline and air was introduced in it so as to get 26 m/sec of means gas stream velocity in the pipeline. Air pressure at the inlet of the pipeline was 0.1 Kg/cm$^2$G. In such a condition, plastic resin pellets as used in Example 1 were supplied continuously through the feed pipe (15) inserted into the apparatus from its bottom plate along the axis of the cylinder. Spiral motion of the pellets moving toward the outlet of the pipeline was observed with the naked eye when the midway part of the pipeline was flashed with a stroboscope.

It was observed too that pellets moving on near the center of the tube moved toward the outlet of the pipeline faster than that of closer to the inside wall of the tube, and the former left the latter behind.

In spite of the repeated experiments using this pipeline, the inside wall of the soft plastic tube was scratched to a very small extent and remained as transparent as that of new one. It indicates that the pellets had not contacted with the inside wall of the tube directly.

As can be seen clearly in the above Examples, a stable spiral gas stream is generated inside the pipeline by this invention. When we projected the spiral gas stream motion on the cross sectional plane of the pipe, it will be a circular motion and inner part of gas is forced to come to outside by centrifugal power to make compressed gas layer at the closer part of inside wall of the pipe, and on the other hand rarefied gas zone is made in the center part of the pipe.

As can be seen in Example 2, gas velocity of spiral stream in the direction of pipe axis becomes faster as is closer to the central part of the cross section of the pipe. On the other hand, gas density becomes lower as is closer to the central part of the pipe.

With relation to the unit quantity of passing gas molecules per unit area and unit time, in other word kinetic gas density will be higher as is closer to the central part of the cross section of the pipe.

It seems to be contradictory, thinking about the lower static gas density there, but you can easily understand it if you imagine about the number of passing cars running on the motorway is more than that of congested road in downtown area.

It means there is different kind of concept about density between kinetic and static system. That is to say, kind of balancing state can be considered by a certain total quantity obtained by adding "field" energy and kinetic energy there.

The reason why circular direction of vector is generated in the pipe, by only given axis direction of vector based on this invention, has not been reached to the level we could explain it enough theoretically and scientifically yet.

In the case of natural typhoon, it is often explained that upward stream of warmed air might be affected by the rotation force of the earth, but that kind of theory is not always applied to this case. The direction of spiral motion, clockwise or counterclockwise, will not be always definite, (It is reported that tornado has both types of directions too).

At the present stage, all we can say are:

(1) Spiral gas stream is generated and keep on stable in a pipeline.

(2) Circular shaped compressed air of thin and motionless (concerning the direction of pipe axis) layer is formed along the inside wall of pipe by the centrifugal force of the spiral motion and certain kind of Coriolis effect.

(3) At the central part of the cross section of the pipe, gas pressure will be the lowest and the gas velocity in the direction of pipe axis will be the fastest inside the pipe.

When solid particles are fed in this spiral gas stream zone, they are transported in the pipeline passing through the low gas density part, moving spirally too. Inside wall of the pipe is protected by the compressed gas layer from the direct contact of coarse solid particles.

As noted a mean gas stream velocity faster than 20 m/sec. is the necessary condition to generate a spiral gas stream in a pipeline. Though 20 m/sec. is the lowest limit figure at which the existence of a spiral gas stream in a pipeline is confirmed by the motion of small amount of solid particles supplied in it in experimental scale, but in the case of an industrial scale, when large quantity of solid particles are to be transported, there is a likelihood of settling of particles on the way. To avoid this it is preferable to adopt the at least 10% higher velocity, 22 m/sec. or more in industrial application. Especially in the case of uprising pipeline, the higher mean gas stream velocity is preferable. The faster the mean gas stream velocity, the more stable transportation will be realized even in the case of larger size or heavier weight solid particles, but on the other hand, much power will be required to introduce necessary gas volume.

As shown in Example 2, solid particles transported in the pipeline pass through either central part of the pipe or closer part of the inside wall of the pipe, which cause the different passing velocity and centrifugal power of each particle. Solid particles often change course in the pipeline in the above meaning, which means different grades of "Field energy" might effect on each solid particle and happen to crush and pulverize them, especially when they are fragile ones. This phenomenon will be noticeable when the mean gas stream velocity is higher, and it would be utilized for the pulverization of solid particles rather than, or together with, the transportation of them.

Another notable thing is the lower gas pressure originated by the spiral motion of gas in the pipe line. Especially in the central part of the circle, that is, along the axis of the pipeline almost vacuum state would be attained, where the volatile matters such as water which are contained in or accompanied with solid particles would be evaporated. If can be applied for the desiccation or concentration of solid particles containing or accompanying volatile matters rather than, or together with the transportation of them. Use of dried gas and longer retention time in the pipeline will be more helpful for the purpose. On the other hand humid gas can be used for keeping from drying of solid particles.

In most cases, air is used as a carrier gas, but nitrogen or other inert gas can be used for special case such as those in which there is a risk of powder explosion.

For the industrial application of the solid particle transportation method by the spiral gas stream system, distance of transportation, head difference, size and weight of particles to be transported, required power and other conditions such as pulverizing or desicatting effect should be taken into consideration for the optimum operation. The diameter of pipeline is determined by the particle size and transportation quantity.

The pressure difference between inlet and outlet of the pipeline in the spiral gas stream system has been described before as at most 1 Kg/cm$^2$. In more detail, the pressure difference between inlet and outlet of the pipeline has a functional relation with pipe diameter, pipelength and mean gas stream velocity in essence. Roughly speaking, either double the pipe length or double the gas stream velocity makes double the pressure difference.

On the other hand, larger diameter of pipe makes smaller the pressure difference, it is reduced in inversely proportional to the square of pipe diameter while being in smaller pipe diameter, but will be less affected as it becomes larger.

For example, in the case of 20 cm of pipe diameter, 100 m of length, 25 m/sec. of the mean gas stream velocity and outlet of the pipeline is opened to the atmosphere, inlet pressure of the gas stream is about 0.05 Kg/cm$^2$G. In another case of 1.5 inch (3.8 cm) of pipe diameter, 200 m of length, 26 m/sec. of the mean gas stream velocity and outlet of pipe is opened to the atmosphere, the inlet pressure of gas stream was 0.1 Kg/cm$^2$G, as shown Example 2.

It is imaginable to reach to more than 1 Kg/cm$^2$ of inlet pressure when pipeline is very long and pipe diameter is very small, but from what we have experienced, it seems 1 Kg/cm$^2$ of pressure difference is almost maximum limit to keep stable spiral gas stream in a pipeline. In another words, it will be unnecessary to use higher pressure than this to get spiral gas stream.

As load variation, change of outlet gas pressure or other hardly controllable factors must be taken into consideration in actual industrial operation, it is recommendable to design to get 0.7 Kg/cm$^2$ or less of pressure difference between inlet and outlet of pipeline for practical operation.

SPIRAL GAS STREAM GENERATOR WITH MOVABLE FEED GAS INLET PIPE

As mentioned above, the feed gas inlet pipe must be installed diagonally at the side of the cylinder so as to make the flow line of the feed gas inclined toward the bottom plate. However, the most suitable inclination angle varies responding to the operating conditions of the apparatus.

It is necessary to increase the mean gas stream velocity in the pipeline to transport larger quantity of solid particles per unit time or to transport either larger size or heavier weight or both of which solid particles.

On the contrary, in order to highten the energy efficiency, it is preferable to reduce the mean gas stream velocity in the pipeline when the quantity of solid particles to be transported are smaller or when the solid particles are smaller and lighter ones.

As the cushion effect of the stagnant gas accumulation near the bottom plate in the cylinder varies responding to the feed-in gas volume per unit time and the inclination angle of the feed gas, it is desirable to adjust the inclination angle of the feed gas responding to the gas volume per unit time of the feed gas to keep the best cushion effect.

Figure 6:
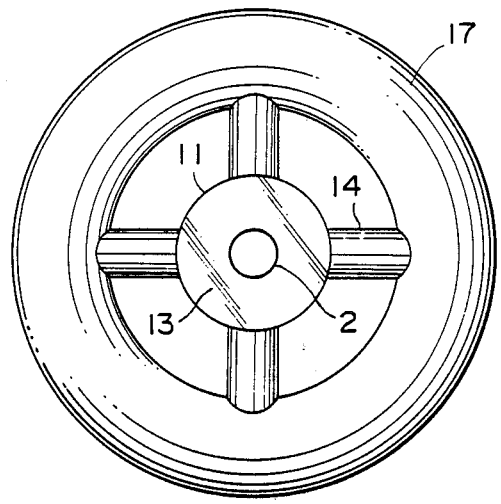
FIG. 6 shows a front view of an apparatus for the generation of a spiral gas stream in a pipeline from the pipeline side.
Figure 7:
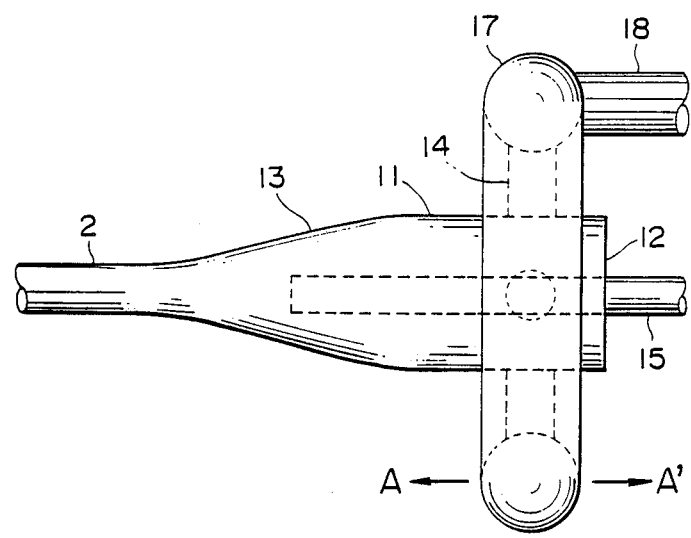
FIG. 7 shows a side view of the same apparatus, of which feed gas inlet pipe is movable to adjust the inclination angle toward the bottom plate in order to keep the best operating condition.

An apparatus designed to attain such an purpose is shown in FIG. 6 and 7. FIG. 6 shows the front view of the apparatus from the pipeline side and FIG. 7 shows the side view of the same apparatus. Doughnut-shaped surge chamber (17) set around the cylinder (11) is connected to the cylinder with feed gas inlet pipe(s) (14) made of flexible material. Feed gas from the outisde gas source such as blower is supplied into the surge chamber (17) through a pipe (18) then introduced into the cylinder (11) through feed gas inlet pipe(s) (14). When the surge chamber is set movably forward or backward parallel to the axis of the cylinder, that is, toward the A—A' direction in FIG. 7, the inclination angle of the feed gas inlet pipe(s) can be changed at will so as to adjust the inclination angle of the flow line of feed gas into the cylinder.

SPIRAL GAS STREAM GENERATOR WITH IMPROVED SOLID PARTICLE FEEDER

As described above, second problem of the conventional pneumatic transportation system is the blow back of solid particles to the screw conveyor caused by the back pressure of air used for the transportation of solid particles. Even in the spiral gas stream transportation system, if a feeder is installed in a usual manner in order to feed solid particles to the spiral gas stream zone, back pressure prevails from the feeder to a hopper of solid particles. Since possible leakage of gas from there can deteriorate the stability of the spiral gas stream, it has been necessary to make the hopper air-tight and to prepare its spare for the purpose of change-over.

The following invention provides an apparatus which can generate a spiral gas stream in a pipeline and keep the outlet part of the solid particle feeder under negative pressure so as to make it possible to feed solid particles continuously and stably without any blow-back problem.

Figure 8:
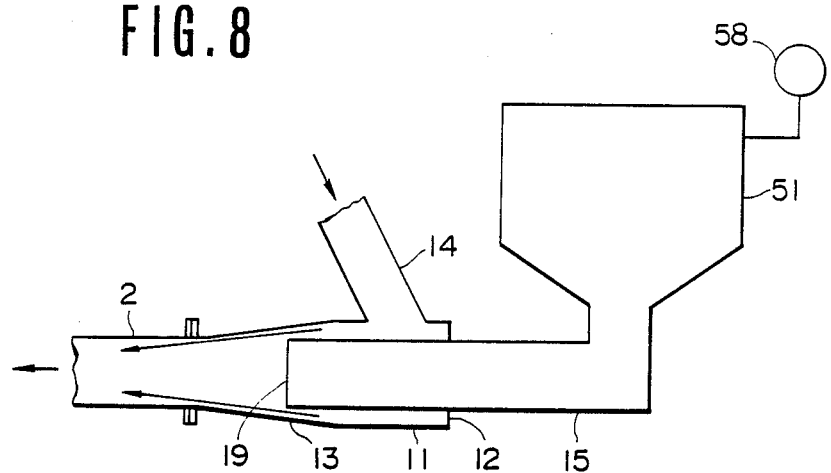
FIG. 8 shows a sectional side view of an improved apparatus for the transportation of solid particles by a spiral gas stream.
Figure 9:
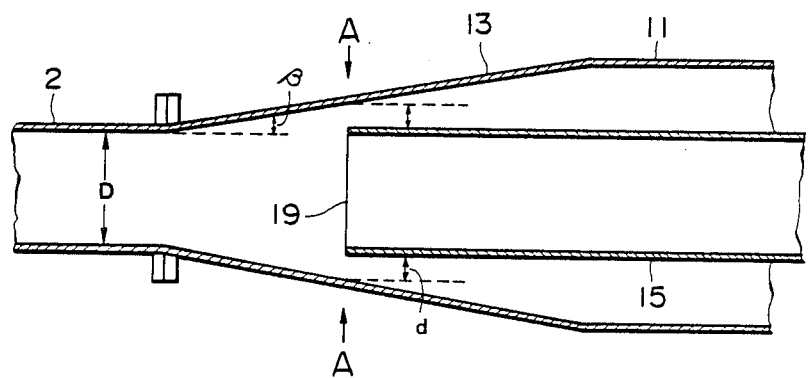
FIG. 9 shows a partial enlargement of FIG. 8.
Figure 10:
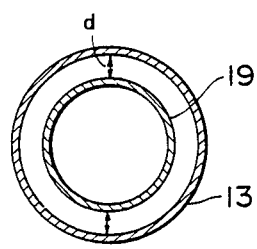
FIG. 10 is a cross sectional view of A—A' line shown in FIG. 9.

FIG. 8 shows a sectional side view of the apparatus. FIG. 9 shows a partial enlarged view of the apparatus shown in FIG. 8 and FIG. 10 shows a cross sectional view along the line A—A' of FIG. 9.

The principal mechanism for the generation of spiral gas stream is same as that of already described.

This apparatus is comprised of a cylinder (11) having inner diameter larger than that of the pipeline (2), a bottom plate (12) attached to one end of the cylinder, a funnelform reducer (13) connected to the other end of the cylinder, gas inlet pipe (14) installed diagonally at the side of the cylinder apart from the bottom end so as to make the flow line of the feed gas into the cylinder to cross the axis of the cylinder and inclined toward the bottom plate and a feed pipe (15) of solid particles inserted from the center of the bottom plate into the cylinder along the axis of the cylinder.

A particular feature of this apparatus is that the funnelform reducer (13) has an inclination angle ($\beta$ in FIG. 9) of less than 15 degree and a feed pipe (15) of solid particles has outer diameter larger than the inner diameter of the pipeline and smaller than the inner diameter of the cylinder and inserted into the cylinder along the axis of the cylinder to the position where the width of the concentric gap (d in FIG. 9 and (10) shaped between the inner wall of the funnelform reducer and the outside wall at the opening (19) of the feed pipe of solid particles is less than one fifth of the inner diameter (D in FIG. 9) of the pipeline.

In such a positional relationship as this, the uniform flow of gas in the cylinder (11) is introduced into the inlet of the pipeline (2) through the concentric gap shaped between the inner wall of the funnelform reducer (13) and the outside wall at the opening (19) of the feed pipe of solid particles along the inclined surface of the reducer at high velocity to generate a spiral gas stream in the pipeline (2) and at the same time lower the gas pressure at the tip (19) of the feed pipe (15) of solid particles.

The pressure is more lowered as the width of the concentric gap is decreased and the gas flow rate is increased. If the width of the gap is smaller, it is possible to lower the pressure with a smaller flow rate of gas down to the negative value with respect to the atmospheric and even if the width is on the contrary larger, it is also possible to realize a negative pressure but when the width of the gap exceeds one fifth of the inner diameter of the pipeline, it is difficult to produce a negative pressure even by increasing the gas flow rate, so that such a large width as this is not practical.

Another end of the feed pipe (15) is connected to the hopper (51) of solid particles. As far as the negative gas pressure prevails around the opening (19) of the feed pipe, solid particles are sucked into the spiral gas stream zone and such a mechanical feeder as a screw conveyor or a rotary feeder is not always required, but one of these can be utilized in order to control the feeding quantity of solid particles.

EXAMPLE 3

An apparatus as shown in FIG. 8, which was constituted by inserting a feed pipe of solid particles having 60 mm outer diameter into a spiral gas stream generator having 90 mm inner diameter of its cylinder part and 15 degree inclination angle of its funnelform reducer part (inner diameter of the reducer at its pipeline side was 50 mm) so that the width of concentric gap formed between the outside wall at the opening of the feed pipe of solid particles and the inside wall of the funnelform reducer was 1 mm, was connected to a 15 m length pipeline made of plastic tube having 62 mm outer diameter and 50 mm inner diameter.

Figure 11:
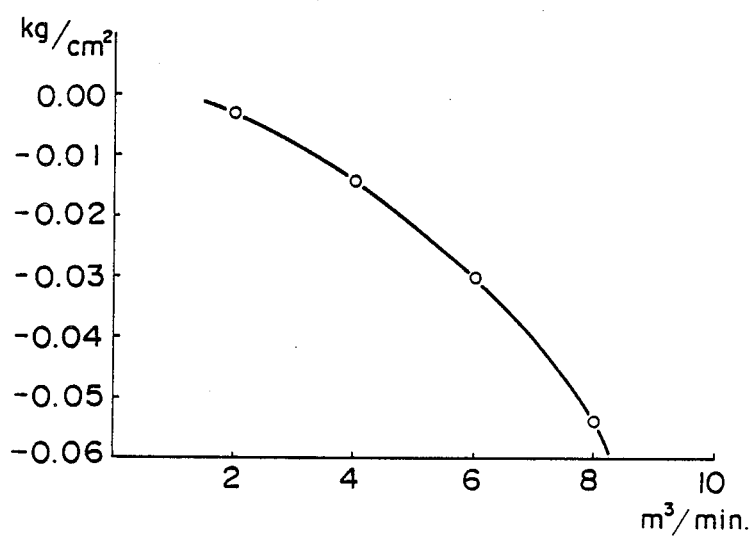
FIG. 11 shows the presssure reducing effect of the apparatus shown in FIG. 8 at a hopper of solid particles.

FIG. 11 shows a result of pressure measurement at a hopper (51) with a pressure gauge (53) in FIG. 8 when air was fed into the apparatus to generate a spiral gas stream in the pipeline at flow rates of 2, 4, 6 and 8 m$^2$/min. with a Roots blower of max. pressure 0.6 Kg/cm$^2$, where the abscissa and the ordinate represent the feeding quantity of gas in m$^3$/min. and the pressure in Kg/cm$^2$ respectively. Since the pressure inside the spiral gas stream generator cannot be measured without disturbing the flow, that in the closed hopper was measured with a pressure gauge (51) but it can be easily understood that the pressure at the opening of the feeder of solid particles is further lower than this.

Because of the negative gas pressure around the opening (19) of the feed pipe (15), solid particles are sucked into the spiral gas stream zone and blow back problem of gas does not occur.

DESICCATION OF SOLID PARTICLES CONTAINING VOLATILE MATTERS

During the transportation test using the spiral gas stream generated by any of the apparatus described above, evaporation of volatile matters was observed when wet powder or slurry containing volatile matters such as water had been fed into the spiral gas stream zone.

Thinking about the cause of this phenomenon, it must be reminded that at the inner part of the pipeline with a spiral gas stream, gas density becomes less and less as approaching to the axis of the pipeline and almost vacuum state in the center of the pipeline. So, the wet powder or slurry supplied in such a spiral gas stream zone is under reduced pressure state during the transportation process in the pipeline and desiccation or concentration comes out as evaporation of volatile matters proceeds.

As for the volatile matters contained or accompanied with the solid particles, whatever matters such as water and organic solvent would be evaporated in the low pressure atmosphere in the spiral gas stream zone. Even the water in a cell of organic tissue would be evaporated by the effect of osmotic pressure.

Under these circumstances, as the evaporated matters are dragged into the spiral gas stream and keep compressing and condensing to the inside wall of the pipe as well as the gas supplied from the inlet, evaporation makes steady progress throughout the pipeline. So, the length of the pipeline is long enough to give the retention time sufficient to evaporate most of the volatile matters, intense desiccation or concentration could be achieved. When opened the outlet of the pipeline to the space, dried solid is recovered as powder and concentrated material is recovered as wet powder or thick slurry.

For example, natural dolomite contains 4 to 5% of moisture in it, but for the industrial use, it is requested to reduce it to about 2%. However, it is rather difficult to dry dolomite and often require much thermal energy to do so. Repeated desiccation method by this invention applying spiral gas stream will make possible to reduce its moisture content without using thermal energy. this method can be applied to solid particles containing other volatile matters than water.

For the transportation purpose, long distance pipeline might be used, but repeated desiccation through the short distance pipeline is effective for the purpose.

EXAMPLE 4

Repeated desiccation of Gifu-dolomite (4.8% of moisture content, particle size: less than 300 micron) supplied at the rate of about 1 Kg/min. to the spiral air stream transportation system (38 mm of pipe diameter, 50 m of pipeline length, 1.37 m$^3$/min. of air feed) was tested, whose results were as follows:

| After 1st transportation | moisture content: 4.2% |
|---|---|
| 2nd | 4.0% |
| 3rd | 2.8% |

EXAMPLE 5

Repeated desiccation test results of Gifu-dolomote containing 4.7% of water by the same method as in Example 4 were as follows:

| After 1st transportation | moisture content: 3.9% |
|---|---|
| 2nd | 3.3% |
| 3rd | 3.0% |
| 4th | 2.5% |

Such repeated desiccation method can be operated by using one spiral gas stream transportation system repeatedly, but the use of two or more spiral gas stream transportation systems one after another is sometimes more effective for desiccation.

Figure 12:
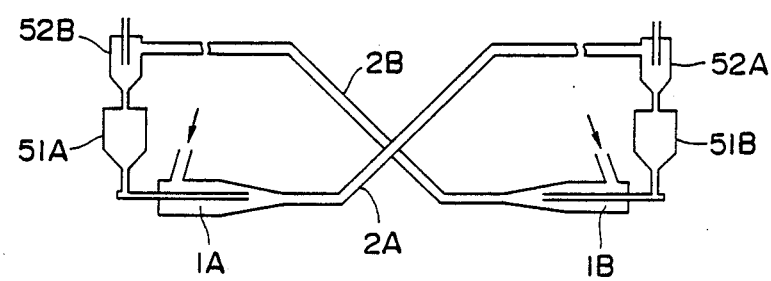
FIG. 12 shows a system for the desiccation of solid particles containing volatile matters using two sets of spiral gas stream generators and pipelines.

A concept of such a system is shown in FIG. 12 in which two lines of spiral gas stream transportation systems are combined.

Wet solid particles are fed from the first hopper (51A) to the line comprised of the first spiral gas stream generator (1A), the first pipeline (2A), the first cyclone (52A), the second hopper (51B), the second spiral gas stream generator (1B), the second pipeline (2B) and the second cyclone (52A) consecutively, and finally returns to the first hopper (51A) to make a cycle.

This system can be applied for hardly drying solid particles other than dolomite or heat sensible solid particles.

DREDGING OF SOLID PARTICLES ON THE BOTTOM OF THE WATER

The spiral gas stream transportation system of solid particles of this invention can be applied to dredging of sediments and sludge on the bottom of the water. In this case, the sediments and the sludge on the bottom of the water are transported in a pipeline and the characteristics of spiral gas stream can be utilized also for separating most of the water accompanied to solid particles in the sediments and the sludge in the course of the transportation.

When a pipeline is arranged so that one end of it is situated in the water, whereas another comes on the water surface and a spiral gas stream generator according to the invention is installed at the end of the pipeline on its side in the water in the pipeline into which air is introduced to form a spiral air stream and sediments and sludge are fed in the spiral air stream then these are transported to another end of the pipeline.

The pressure difference used in gas feed for forming a spiral gas stream in an underwater pipeline, never exceeds 1 Kg/cm$^2$ with regard to the environmental pressure.

The environmental pressure here represents the external, that is, absolute pressure in a place where the spiral gas stream is formed: An environmental pressure at 10 m below the water surface, for example, is equal to a sum of the water column pressure, 1 Kg/cm$^2$, plus the atmospheric pressure 1 Kg/cm$^2$, that is, to 2 Kg/cm$^2$. In this case, consequently, the absolute pressure to be used for gas feed will be less than 3 Kg/cm$^2$.

Since in a spiral gas stream system a difference between the external environmental and the internal pressure is thus small, it is not always necessary to use such a hard material as steel pipe for the pipeline but it is also possible to use a soft material such a plastic tube.

In a system for forming forcibly a circulating air stream by feeding high-pressure air into the pipeline in the tangential direction, its transportation mechanism consists in blowing-up due to jet flow, so that the internal pressure is by far higher.

As the mean gas stream velocity of 20 m/sec. is the minimum condition necessary to generate a spiral gas stream in a pipeline, a higher velocity is required in order to raise dredged material in the vertical direction. Larger or heavier solid particles require higher mean gas stream velocity, so that the optimum mean gas stream velocity must be selected according to a material to be dredged.

An apparatus for generating a spiral gas stream in a pipeline and for supplying sediments on the bottom of the water corresponds fundamentally to that which has a form shown in FIG. 3, and it can be installed either horizontally or vertically.

EXAMPLE 6

Figure 13:
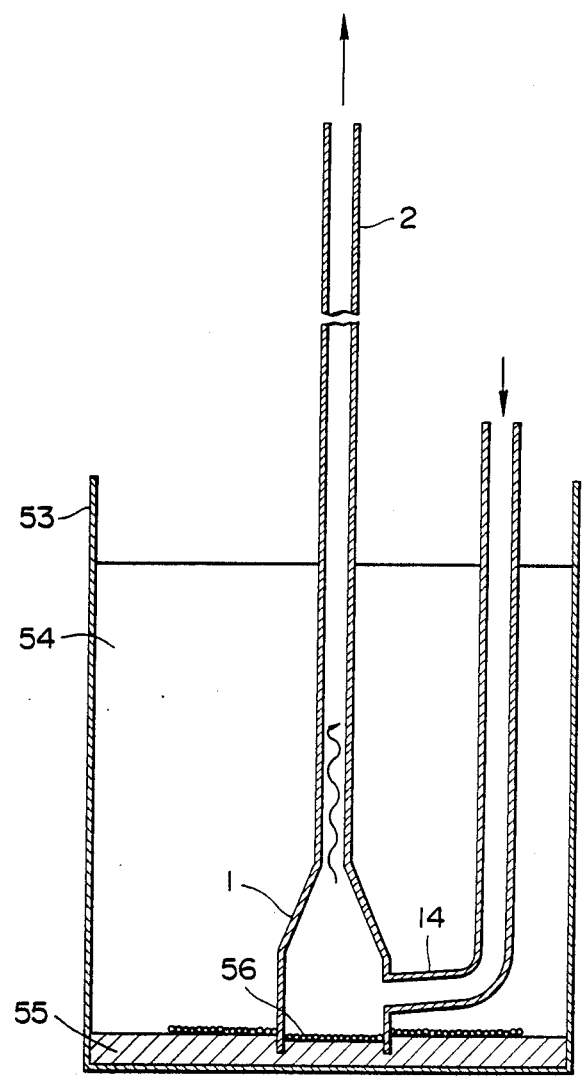
FIG. 13 shows an experimental apparatus used in Example 6 and 7 demonstrating the transportation of solid particles on the bottom of water.

An experimental apparatus as shown in FIG. 13 was assembled: At the lower end of a vertical pipe (2) composed of transparent plastic tube of 1.5 inch diameter, a spiral gas stream generator (1) was fitted and installed in a vessel (53) which contains water (54) 150 cm deep. The spiral gas stream generator (1) was about 40 cm high with a cylinder of 15 cm diameter and opened at the lower end without bottom plate and feed pipe of solid particles.

On a sponge sheet (55), 5 cm thick, laid on the bottom of the vessel, a large number of pellets (56) of synthetic resin, cylindrical of 5 mm diameter and 5 mm long with 1.2 to 1.3 specific gravity were dispersed and the apparatus was placed on a thus formed plastic pellet layer and tightly pressed on the sponge sheet so as to prevent possible leakage of air and at the same time to bring a part of the pellets into the cylinder of the spiral gas stream generator. In this case, water is also brought in the apparatus and additional water was supplied through the sponge from outside. In the vertical pipe 4 m high above the water surface, an upward spiral gas stream was formed by feeding air from a gas inlet pipe (14) of the spiral gas stream generator so that the mean gas stream velocity in the vertical pipe attains 30 m/sec., and the pellets flew out high from the upper end of the vertical pipe. A part of water flew out from the upper end of the vertical pipe in an umbrella-like shape and the remaining part of water overflowed the brim of upper end of the vertical pipe and fell along the outer wall of the vertical pipe.

The phenomenon can be explained as follows: Water and pellets brought in the cylinder of the spiral gas stream generator were sucked into the spiral gas stream zone and begun to rise while moving spirally. The water was collected toward a path, which runs near the inner wall of the pipe and only slightly moves in the vertical direction, whereas the pellets were collected at the axial part or near this in the pipe to move upward at a high velocity. As a result, the pellets flew out high due to their high inertia at the pipe outlet, whereas the slowly rising water did not fly out so remarkably because of its slight inertia.

Similar experiments were repeated transferring the apparatus (1) to other spots on the layer of pellets (56), and pellets from these spots were also sucked up.

EXAMPLE 7

The procedure was the same as that of Example 6, except that the vertical pipe (2) was 2 m high on the water surface and instead the pellets ceramic balls of about 5 mm diameter with about 4.0 specific gravity were used. The ceramic balls flew out high from the upper end of the pipe and water overflowed from the brim of the upper end of the pipe in the same manner to that of Example 6.

As a concrete application example, this system can be applied to the transportation and dehydration of solid particles containing or accompanying water such as sludge deposited on the bottom of solid/liquid separation vessels utilizing specific gravity difference in the sedimentation, concentration etc., to make easier their post treatment.

A mixture of water and solid particles such an sludge formed in a pollution control equipment etc. has been so far discharged with a pump from the bottom of a solid/liquid separating device. An underwater pump must be used in the case of a large scale solid/liquid separating device, of which lower part is buried in the ground. But the conventional method is uneconomical because not only such as underwater pump is costly with complicated mechanism but also it requires much energy for the transportation of much quantity of water accompanying solid particles and for the following dehydration and drying process.

Figure 14:
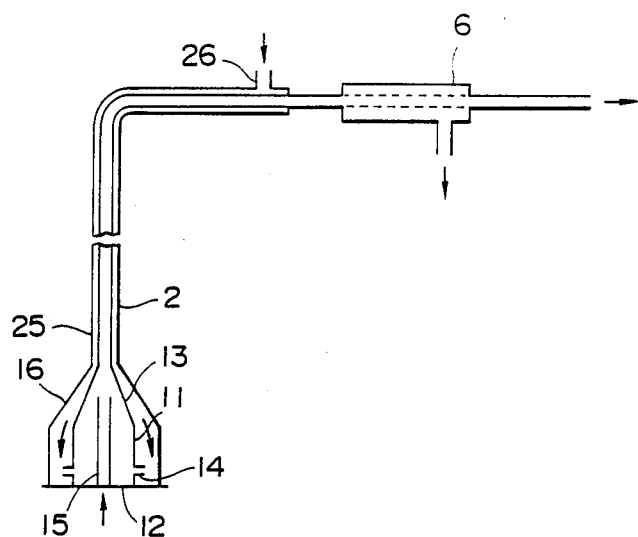
FIG. 14 shows an apparatus for the dredging and dehydration of slurry on the bottom of water.
Figure 15:
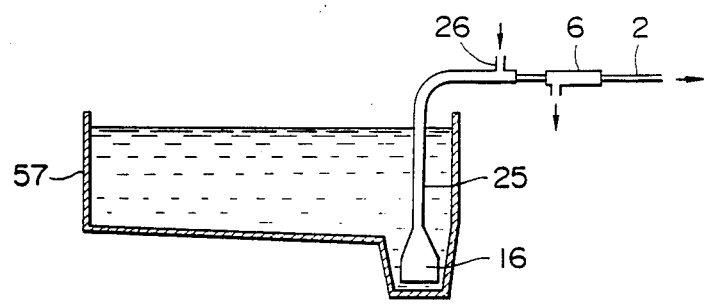
FIG. 15 shows an seidimentation tank fitted with the apparatus shown in FIG. 14.

FIG. 14 shows the fundamental constitution of an apparatus for transporting and at the same time dehydrating the above mentioned sludge accompanying water. A pipeline (2) which is laid from around the bottom of water to a specified place out of water surface is surrounded by an external pipe (25) to form a double pipe at its underwater part and fitted with an air intake pipe (26) at an upper part of the external pipe of said double pipe.

To the water bottom end of the pipeline which constitutes the internal pipe of the double pipe, a spiral gas stream generator is connected. The spiral gas stream generator is comprised of a cylinder (11) having inner diameter larger than that of the pipeline, a funnelform reducer (13) connecting the water bottom end of the pipeline and one end of the cylinder, a bottom plate (12) closing the other end of the cylinder, feed gas inlet pipe(s) (14) installed diagonally at the side of the cylinder apart from the bottom end so as to make the flow line of the feed gas to cross the axis of the cylinder and inclined toward the bottom plate, a feed pipe (15) of solid particles inserted from the center of the bottom plate into the cylinder along the axis of the cylinder and an outer casing (16) which covers the funnelform reducer and the cylinder by expanding the lower part of the external pipe of said double pipe and guides the air flowing through a gap between the external and the internal pipes of the double pipe to the feed gas inlet pipe installed at the side of the cylinder. The pipeline beyond the double pipe part is partially provided with a dehydration pipe (6) having a number of holes or gaps.

When air is fed from an air intake pipe (26) fitted at an upper part of the external pipe of the double pipe, the air descends through the gap between the internal and the external pipes. Since this section works as an equalizing chamber, the pulsation of air flow originated from the outside gas source is perfectly eliminated and the air is fed from the outer casing (16) through the gas inlet pipe (14) into the cylinder (1). The mechanism of spiral air stream generation after this step is the same as described above.

A mixture of water and solid particles to be transported is introduced into the funnel part near the pipeline inlet where a spiral gas stream is generated as the average gas stream velocity increases. When the spiral gas stream generator as shown in FIG. 8 is used, negative pressure prevails around this part and the mixture of water and solid particles on the bottom of the water is sucked into the spiral gas stream zone to be transported to the pipeline outlet.

Solid particles deposited on the bottom of the solid/-liquid separating apparatus form usually a kind of water sludge containing a very high percentage of water and can be thus sucked into the spiral gas stream zone, where the solid particles are, as was already described, separated from their water content, which is attached on the inner wall of the pipeline to move slowly towards the outlet. If this water content is extracted in the dehydration pipe (6) installed midway of the pipeline, it is possible to obtain dehydrated solid particles at the pipeline outlet.

FIG. 10 shows this apparatus installed in a sedimentation tank (57), but it is possible to use this apparatus not only at a fixed place but also to apply it in order to transport and dehydrate sediments and sludge on the bottom of the water such as those of river and sea.

Since this apparatus has a very simplified structure at the part which is immersed in dirty water, it can get out of order very rarely and be easily maintained and inspected.

Figure 16:
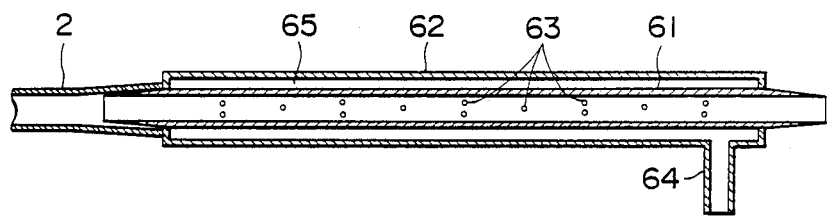
FIG. 16 shows the detail of the dehydration pipe used in the apparatus shown in FIG. 14 and 15.

FIG. 16 shows detail of the dehydration pipe (6) shown in FIG. 14. This is a double pipe composed of the internal pipe (61) of the same inner diameter as that of the pipeline and of the external pipe (62) covering the internal pipe. The internal pipe (61) is provided with a large number of small holes (63) and a discharge pipe (64) for discharging separated water is connected to the external pipe (62) on its lower side and the lower end of the discharge pipe (64) is liquid-sealed to prevent possible escape of the carrier gas from here.

The reason to make the internal pipe of this dehydration pipe to have the same inner diameter as that of the pipeline is that an abrupt change in diameter of the pipeline is injurious to the stability of the spiral gas stream, but a slight change is permissible.

Figure 17:
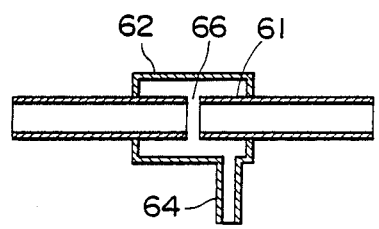
FIG. 17 shows another type of dehydration pipe.

Water, separated in the pipeline upstream of this dehydration pipe and moved toward the dehydration pipe while attaching to the pipe wall in the form of water film, leaks out into the space (65) between the internal and external pipes through these small holes and collected into the discharge pipe (64). If the lower end of the discharge pipe (64) is liquid-sealed so that only the liquid separated from the pipeline is discharged out, whereas the carrier gas stream in the pipeline will be never affected negatively and can transport thus dehydrated solid particles to the outlet of the pipeline. If the holes (63) are sufficiently small, it is not necessary to install such a liquid seal as this. FIG. 17 shows a structure comprising a slit (66) instead of a large number of small holes and its effect is the same as that of the structure shown in FIG. 16. The device shown in FIG. 17 is more effective if the slit (66) is covered with a filter cloth.

Since it is possible to increase progressively the percentage of dehydration in such a dehydration pipe as this if a plurarity of it is installed with a suitable intervals as necessity demands, it is recommendable to install a suitable number of dehydration pipes midway of the pipeline according to the percentage of mixed water in the mixture of water and solid particles and that of dehydration aimed.

Since a mixture of water and solid particles such as sludge formed in a sewage disposal plant or an industrial wastes treatment equipment has a very high percentage of water and moreover the water content is often kept in biomembrane or exists in the form of colloid, it is difficult to lower the percentage of mixed water by a usual filtering operation. For the purpose of its transportation, consequently, such a mixture as this requires a large amount of power because a large quantity of water must be simultaneously transported and it also requires uneconomically large equipment and a large quantity of heat energy if it is finally to be dehydrated and dried or incinerated. The apparatus according the invention can solve such problem as these.

PULVERIZATION OF SOLID PARTICLES

The conventional method for the pulverization of solid particles are the use of mills or the mutual collision of solid particles transported in plural pipelines using a high speed air stream. In the latter method, wear and tear of the pipeline are severe and it require frequent repair.

This problem can be solved by the use of spiral gas stream for the transportation of solid particles.

That is, the solid particles to be pulverized are transported by a spiral gas stream in a pipeline in the manner as describe above, and arranged to collide mutually with other solid particles transported by a spiral gas stream in another pipeline at the outlet of the pipelines each other.

Figure 18:
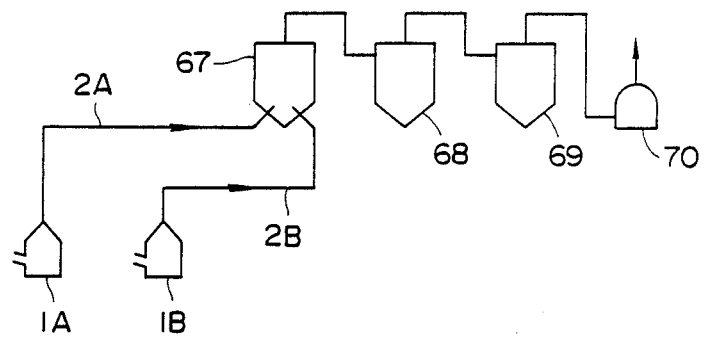
FIG. 18 is an apparatus for the pulverization of solid particles.

FIG. 18 shows a system for the application of this invention. Two series of pipelines 2A and 2B (inlets of which are connected to spiral gas stream generators 1A and 2A respectively) transporting solid particles by a spiral gas stream are inserted into a pulverization chamber (67) and arranged to collide the solid particles mutually at the outlet of the pipelines. The pulverized solid particles are transported by a gas stream to a cyclone (68) to separate coarse and fine solid particles. The coarse solid particles are discharged from the bottom of the cyclone (68) and recycled to the pulverization process and pulverized fine solid particles are transported by a gas stream into a collector (69) and recovered. Symbol (70) indicates a suction blower.

EXAMPLE 8

Solid particles transported by spiral gas stream in two pipelines arranged as shown in FIG. 18 were collided mutually in a pulverization chamber. The gas pressure at the inlet of pipelines were 0.1 Kg/cm$^2$ G and the mean air stream velocity in the pipelines were set to 60 m/sec.

When limestone of $D_{80}$ 1000 micron ($D_{80}$ means that 80% of the material passes a sieve) was used as a raw material, 95% of the solid particles after on pass pulverization was under 200 micron. When dolomite of $D_{80}$ 1000 micron were used as raw material, 95% of the solid particles was under 300 micron.

PROMOTION OF CHEMICAL REACTION IN A SPIRAL GAS STREAM

Spiral gas stream formed in a pipeline has various interesting characteristics and it was observed that a chemical reaction which is difficult to proceed at normal temperature and pressure had occurred when a spiral gas stream of reactive gaseous component(s) had been formed in a pipeline or reactive component(s) had been introduced into a spiral gas stream zone.

When liquid or solid component is to be used for the reaction, feed pipe (15) as shown in FIGS. 3, 7 or 8 can be used to feed the component in the center of the spiral gas stream zone. In the case of liquid component, it reacts either in the form of mist with other gaseous or mist form component or in the form of vapor formed by the vaporization in the spiral gas stream zone. In the case of solid component, it is desirable to use it in the form of fine solid particles to highten the reactivity. However, as it was observed in other experiments that the pulverization of solid particles proceeded if the solid component is brittle one, it is not limited to fine solid particles. Solid component introduced in a spiral gas stream zone reacts with gaseous component constituting the spiral gas stream or with liquid component introduced simultaneously with the solid component.

At present, the reason why such a chemical reaction proceeds in the spiral gas stream zone is only at a stage of estimation, but it is supposed that a high "field" density and very low gas pressure approximately vacuum in the axis of the spiral gas stream contribute to highten the reactivity of each molecule.

EXAMPLE 9

Figure 19:
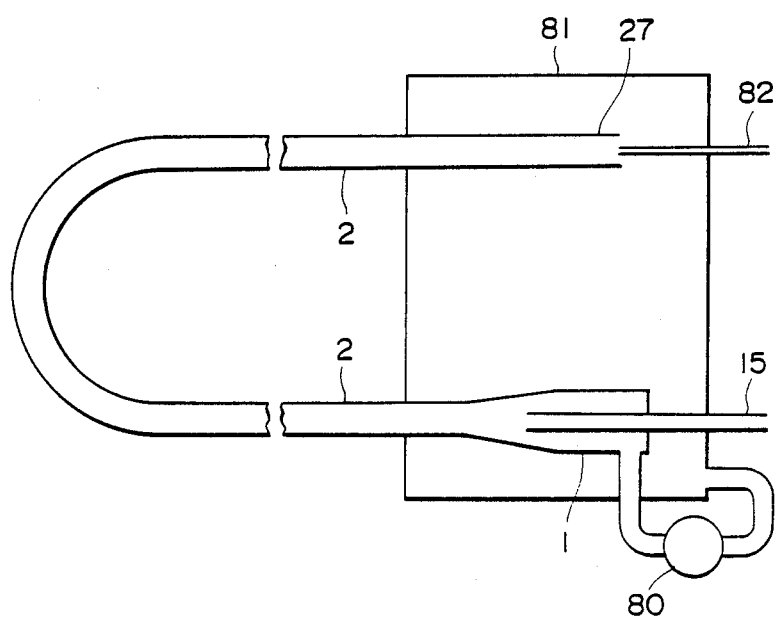
FIG. 19 shows an experimental apparatus for the promotion of chemical reaction in spiral gas stream zone.

A 100 m long looped pipeline of 8 inch gas pipe (inner diameter 20 cm) was set and a gaseous mixture of hydrogen 67% and nitrogen 33% was introduced into the inlet of a pipeline. Outline of the experimental apparatus is shown in FIG. 19. A spiral gas stream generator (1) was set in a shield chamber (81) filled with said gaseous mixture for the experiment and the gaseous mixture was fed in to the spiral gas stream generator with an gas blower (80). A feed pipe (15) was closed with a plug. Said 100 m long pipeline (2) was connected to the outlet of the spiral gas stream generator, turned U-wise at the midway, and the outlet (27) of the pipeline was opened in the shield chamber (81). In this manner, the experiment could continue for a long time with relatively small amount of gas for the reaction. A sampling pipe (82) was inserted in the center of the outlet (27) of the pipeline: sample gas was analyzed and small amount of ammonia was detected.

EXAMPLE 10

The same apparatus used in Example 9 was used and a spiral gas stream composed 100% hydrogen was formed. Into the spiral hydrogen stream zone, powder of iron oxide was fed from the feed pipe (15) and a small amount of deoxidized iron was recovered at the outlet of the pipeline.

As demonstrated in Example 9 and 10, a chemical reaction which can not or hardly to proceed at normal temperature and pressure can be promoted in a spiral gas stream. It can be operated at higher temperature by heating the pipeline and at higher pressure by keeping the whole system at high pressure condition and maintaining the pressure difference between the inlet and outlet of the pipeline under 1 Kg/cm$^2$.

What is claimed is:

1. An apparatus for the generation of a spiral gas stream in a pipeline consisting essentially of:
   a funnelform reducer adapted for connecting to a pipeline pipe;
   a cylinder having a first end and a second end, said first end connected to said funnelform reducer, said cylinder having an inner diameter larger than the diameter of said pipeline pipe;
   a bottom plate attached to said second end of said cylinder; and
   at least one gas inlet pipe adapted for admitting a feed gas into said cylinder, located to the side of said cylinder, at an inclination angle of more than one degree to said bottom plate, at a distance from said bottom end so as to direct the center of the gas flow of said feed gas into said cylinder intersecting the longitudinal axis of said cylinder and inclined toward said bottom plate to the extent that the feed gas flow does not directly hit said bottom plate.

2. An apparatus according to claim 1 wherein the inclination angle of said gas inlet pipe is adjustable so as to vary the inclination angle of the center of gas flow of the feed gas toward said bottom plate.

* * * * *